United States Patent
Daly et al.

(10) Patent No.: US 11,139,975 B2
(45) Date of Patent: Oct. 5, 2021

(54) AUTHENTICATION IN NON-SECURE COMMUNICATION CHANNELS VIA SECURE OUT-OF-BANDS CHANNELS

(71) Applicant: INTERNATIONAL BUSINESS MACHINES CORPORATION, Armonk, NY (US)

(72) Inventors: Elizabeth Daly, Dublin (IE); Spyridon Antonatos, Dublin (IE); Stefano Braghin, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 16/194,610

(22) Filed: Nov. 19, 2018

(65) Prior Publication Data
US 2020/0162253 A1 May 21, 2020

(51) Int. Cl.
| | | |
|---|---|---|
| *G06F 21/00* | (2013.01) | |
| *H04L 9/32* | (2006.01) | |
| *H04L 29/06* | (2006.01) | |
| *G06F 21/30* | (2013.01) | |
| *G06F 21/31* | (2013.01) | |
| *G06F 21/42* | (2013.01) | |

(52) U.S. Cl.
CPC ............ *H04L 9/3213* (2013.01); *G06F 21/30* (2013.01); *G06F 21/31* (2013.01); *G06F 21/42* (2013.01); *H04L 63/0807* (2013.01); *H04L 63/102* (2013.01); *H04L 63/18* (2013.01)

(58) Field of Classification Search
CPC ........ G06F 21/30; G06F 21/31; G06F 21/313; G06F 21/33; G06F 21/34; G06F 21/36; G06F 21/42; G06F 21/43; H04L 9/3213; H04L 63/0807; H04L 63/102; H04L 63/18
See application file for complete search history.

(56) References Cited

U.S. PATENT DOCUMENTS

| | | | |
|---|---|---|---|
| 5,826,245 | A | 10/1998 | Sandberg-Diment |
| 6,012,144 | A | 1/2000 | Pickett |
| 6,324,271 | B1 | 11/2001 | Sawyer |
| 7,373,515 | B2 | 5/2008 | Owen |
| 8,266,434 | B2 | 9/2012 | Muller |
| 8,365,258 | B2 | 1/2013 | Dispensa |
| 8,769,288 | B2 | 7/2014 | Sundaram |
| 2008/0198991 | A1 | 8/2008 | Saito |
| 2009/0046839 | A1 | 2/2009 | Chow |
| 2011/0051909 | A1* | 3/2011 | Frederick ................ G06F 21/31 379/88.19 |
| 2011/0191842 | A1 | 8/2011 | Lindholm |

(Continued)

OTHER PUBLICATIONS

"Method for two-way caller/callee direct authentication and validation" at:https://ip.com/IPCOM/000242013 Authors Disclosed Anonymously IP.com No. IPCOM000242013D IP.com Electronic Publication Date: Jun. 14, 2015 (3 pages).

*Primary Examiner* — Edward Zee
(74) *Attorney, Agent, or Firm* — Griffiths & Seaton PLLC

(57) ABSTRACT

Various embodiments are provided for authenticating an entity in non-secure communication channels via secure out-of-bands channels. An operator may be authenticated to have access to a secured location associated with an entity upon determining the operator retrieved and communicated a unique token, provided by the user and stored at the secured location, back to the user.

15 Claims, 8 Drawing Sheets

(56) References Cited

U.S. PATENT DOCUMENTS

| | | |
|---|---|---|
| 2014/0109203 A1 | 4/2014 | Pemmara |
| 2015/0170236 A1* | 6/2015 | O'Connor ............ H04L 63/083 |
| | | 705/26.35 |
| 2015/0215307 A1 | 7/2015 | Herzog |
| 2016/0112562 A1* | 4/2016 | Krack ................ H04M 3/5166 |
| | | 379/189 |
| 2016/0261414 A1 | 9/2016 | Lee |
| 2016/0352894 A1* | 12/2016 | Mulay ................ H04M 3/5158 |
| 2018/0139206 A1 | 5/2018 | Ezell |
| 2020/0014543 A1* | 1/2020 | Paterson ............... H04L 9/3226 |

\* cited by examiner

AUTHENTICATION IN NON-SECURE COMMUNICATION CHANNELS VIA SECURE OUT-OF-BANDS CHANNELS

BACKGROUND OF THE INVENTION

Field of the Invention

The present invention relates in general to computing systems, and more particularly to, various embodiments for authenticating an entity in non-secure communication channels via secure out-of-bands channels by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. With the proliferation of these technologies, computer system may be accessed from practically anywhere. Today's information systems contain private information, individually sensitive information or personalized information, which many computing systems are required to protect.

SUMMARY OF THE INVENTION

Various embodiments for authenticating an entity in non-secure communication channels via secure out-of-bands channel by a processor, are provided. In one embodiment, by way of example only, a method for authenticating and validating an identify of an operator claiming association with an entity, again by a processor, is provided. An operator may be authenticated to have access to a secured location associated with an entity upon determining the operator retrieved and communicated a unique token, provided by the user and stored at the secured location, back to the user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
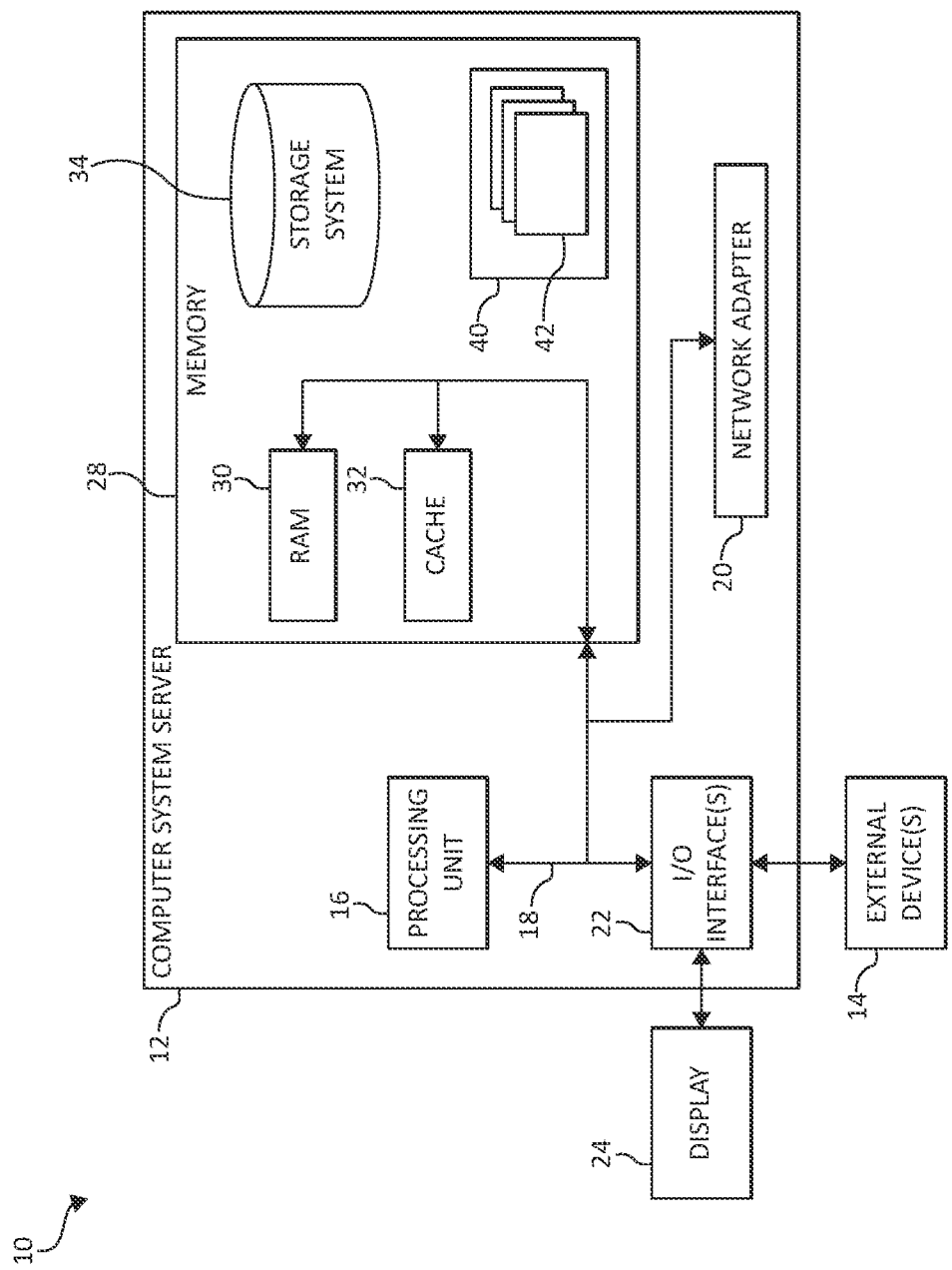
FIG. 1 is a block diagram depicting an exemplary cloud computing node according to an embodiment of the present invention.

Authentication is the process of determining whether someone or something is, in fact, who or what it is declared to be. In private as well as public computer networks, authentication is commonly performed through the use of login passwords. Knowledge of the password is assumed to guarantee that the user is authentic. Each user initially registers (or is registered by someone else), using an assigned or self-declared password. On each subsequent use, the user must know and use the previously declared password. One primary weakness in this approach is that passwords can be stolen, accidentally revealed, or forgotten. For example, a username and password credentials may be insufficient and not strong enough to protect various resources. A second factor authentication (2FA) may be used to measure and enhance security of protected resources. 2FA may require extra/additional steps and create additional "friction" for users to go through to authenticate.

Moreover, often many persons receive calls from persons, organizations, institutes, business and the like that request personal information and/or credentials for verification. For example, a person's bank may call the person to verify a transaction or a person's mobile operator may call the person for a contract extension etc. While the caller has the ability to verify your identity, or tricks the person into providing personal information, there is no mechanism to do the reverse authentication (e.g., how can a person verify that a caller calling the person and claiming association with an entity is legitimate such as, for example, being a legitimate bank employee). One possible way is to give false credentials and check if the caller will accept them. However, legitimate offers of the service will be denied. Also, reporting of these incidents requires effort and does not yield increased security levels since, for example, multiple scam instances take place due to the lack to verify the caller. In general, a non-secure means of communication such as, for example, a phone or short message service "SMS") may be used for one-way verification purposes. Technically, the reverse authentication is not feasible unless an out-of-bands channel can be verified, such as the entity's (e.g., bank's) secure website. In one aspect, out-of-bands channel may be any communication channel other than the one used in the initial communication. For example, if the initial communication is using a wireless communication line (e.g., a telephonic communication), an out-of-band channel may be an alternative channel that is using internet, email, or face-to-face voice communication. Accordingly, the present invention provides for verifying the authenticity of the caller by storing a user-provided messages/token to a verifiable means of communication, such as the bank's secure website.

In one aspect, the present invention provides for authenticating and validating an identify of an operator claiming association with an entity. An operator may be authenticated to have access to a secured location associated with an entity upon determining the operator retrieved and communicated a unique token, provided by the user and stored at the secured location, back to the user. The present invention may verify the identity of people (operators) that use non-secure communication channels (e.g., a telecommunication/phone system) to contact users.

In one aspect, two operations for authenticating operators that use non-secure channels may be provided. The first operation includes verifying that the operator has read access to a secured location belonging to the operator's claimed organization. The client of an entity may upload a secret token to the secured location of the entity and the operator verifies his/her authenticity by retrieving the token and communicating the token back to the client.

The second flow verifies that the operator has write access to a secured location belonging to the operator's claimed entity/organization. The client may communicate (e.g., verbally over the phone/send a text via a user equipment "UE") a secret token to the operator and the operator may store the token in the secured location of the entity. The client may then access the website of the entity and verify the authenticity by reading the stored token from the secured location of the entity.

In an additional aspect, the present invention performs authentication of an operator (e.g., "Operation A") that uses a non-secure means to communicate with user U. The user U verifies the identity of operator A by using a secure means of communication channel such as, for example, a secure website that belongs to operator A's claimed association to an entity (e.g., business, organization, government, institute, etc.). User U provides a secret message, unique in each case/situation, to operator A while their communication is in progress and asks operator A to store the message in a location of the claimed-associated entity that can be accessed via the secure means of the communication channel that belongs to operator A's entity. If the operator A is legitimate, operator A will have the appropriate access to store the message to the entity that operator A is claiming to be associated with (e.g., operator A should be able to access the bank's website if operator A claims to be an employee of the bank). The user U will then be able see and/or access the secured location (e.g., website and associated account of the entity) of the entity and see the secret message in the secured location and will continue the communication. If the operator A is not legitimate, user U will not see their secret message appearing and can stop/terminate the communication with operator A.

Accordingly, the present invention provides a solution to the authentication challenge for all non-secure communication channels, such as phones and SMS, in a uniform way and without any channel-specific requirements. The present invention may provide real-time authentication and can be invoked while the communication between a caller and client is in progress, and/or may provide for non-real-time/offline communications. For example, if the recipient of an email does not trust the sender, the present invention may perform the authentication, as described herein, without the existence of third-party authentication operations/mechanisms such as, for example, a server-side certificates requires a trusted entity to verify the validity of the certificate.

It should be noted that the present invention provides for secure communication channels that can authenticate the legitimacy of the parties involved such as, for example, secure web sites. In one aspect, certificates of secure web sites may provide the necessary mechanism to authenticate that the users are accessing the correct location and also that the location belongs to the company owning the certificate. It should be noted that the certificate issuance require legal proof of identity and ownership and certificate spoofing is detectable.

The present invention may also require that employees of an entity (e.g., company) have access to store user-provided messages to one or multiple locations within the secure web site space. For example, the employees of the entity may have the appropriate access control to store the message in the user's profile page on the secure web page.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
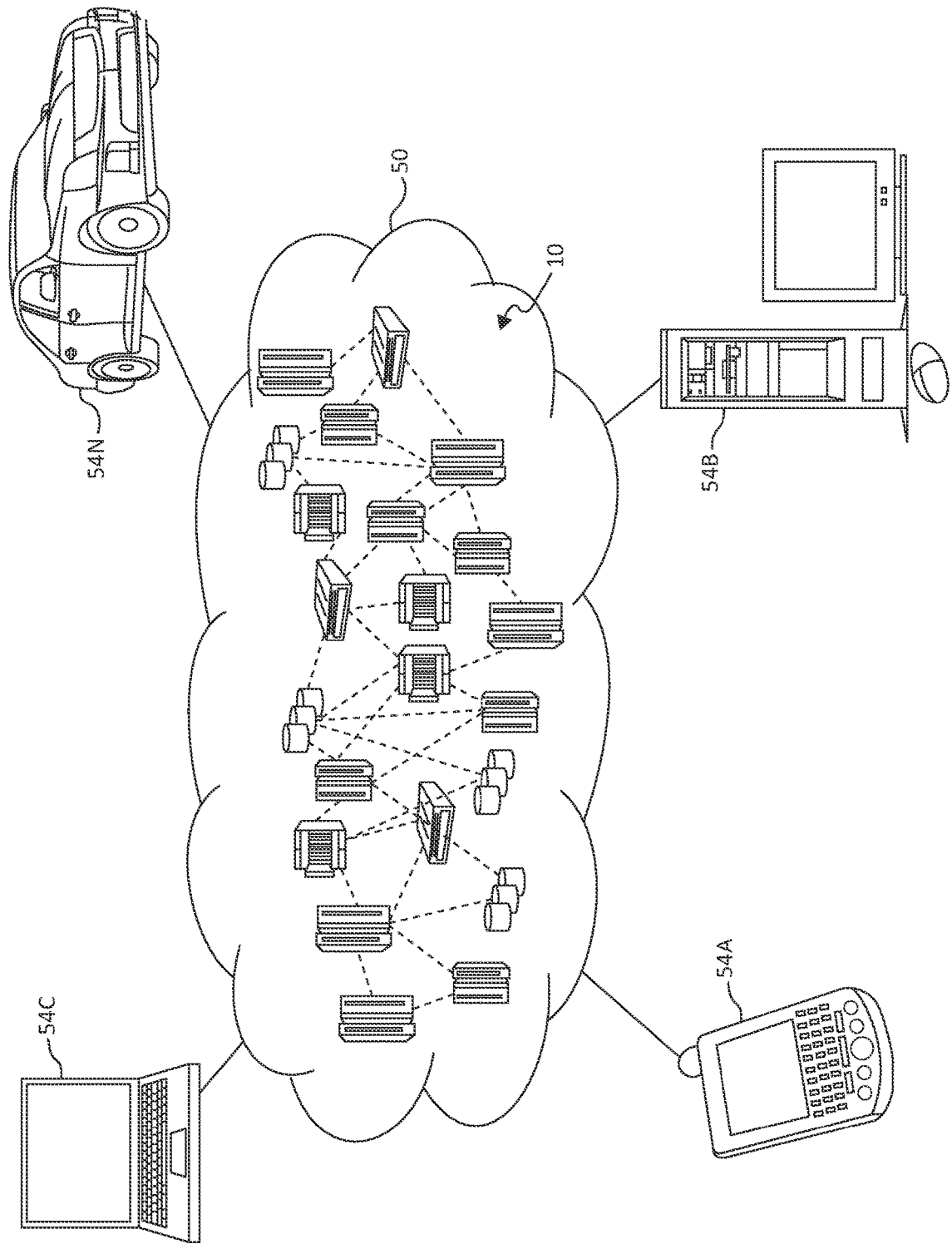
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
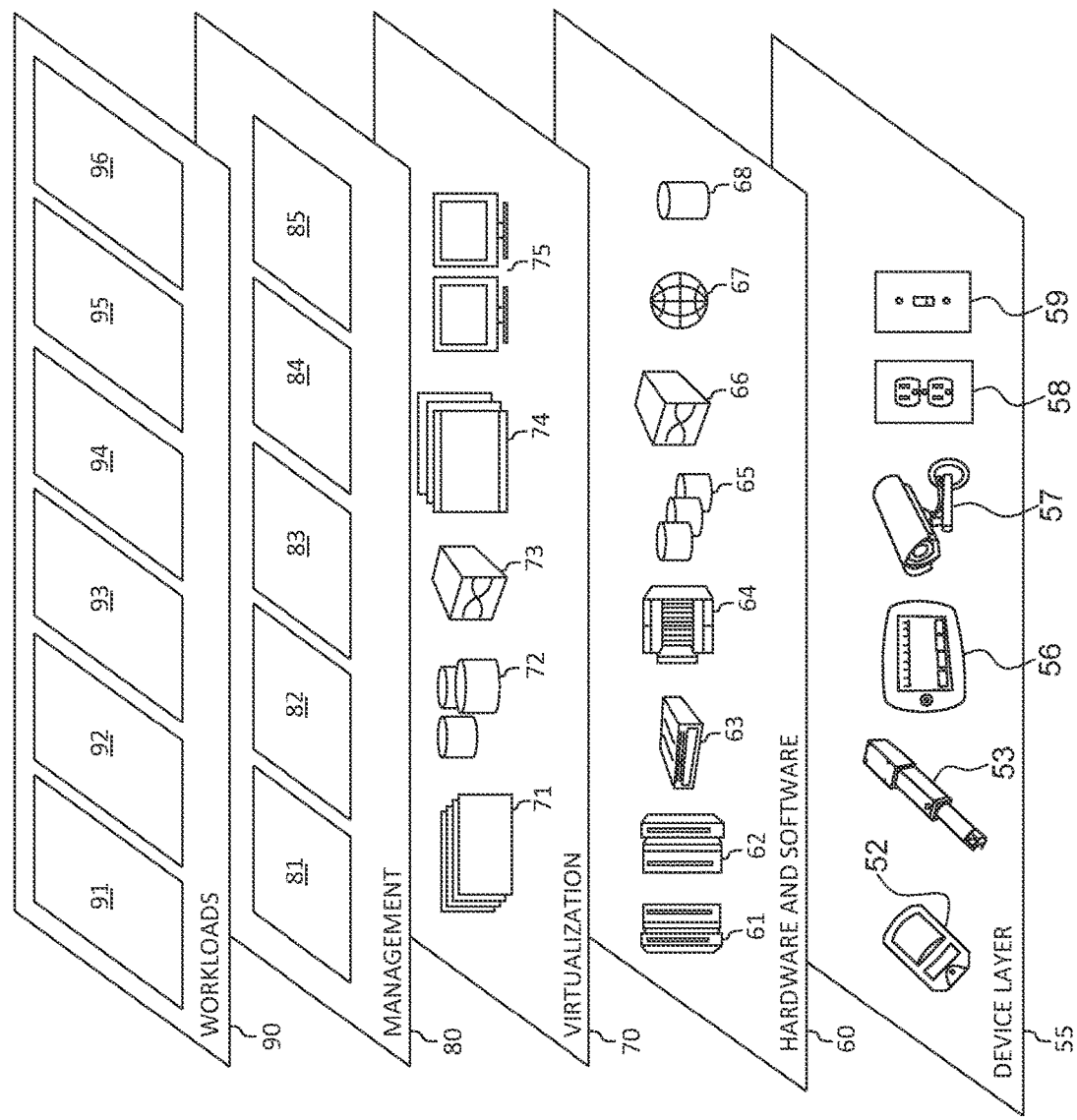
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for inferred access authentication decision for an application. In addition, workloads and functions 96 may include such operations as data analytics, data analysis, and as will be further described, notification functionality. One of ordinary skill in the art will appreciate that the workloads and functions 96 for inferred access authentication decision for an application may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously described, the present invention provides for authenticating an entity in non-secure communication channels via secure out-of-bands channel by authenticating and verifying initiating parties (operators) in unverifiable channels (e.g., telecommunication systems) by recipients (users).

To verify write access of the operator to a secured location, a client-side token generation and verification application may be used where the client-side token generation and verification application accesses a predefined location or locations to read a one-time code and verify the code matches the locally stored token. A server-side operation may be used for storing a supplied token to an access-controlled location, thereby making the supplied token available to read to be read by the client application.

To verify read access of the operator to the secured location, a client side token generation application may be used where the application transmits the token to a predefined access controlled location. A server-side operation may be used for retrieving a transmitted token from predefined access controlled location to be read by the operator.

Also, the client application (e.g., the client side token generation application) maintains a list of predefined secured locations and their corresponding operators to be verified.

Figure 4:
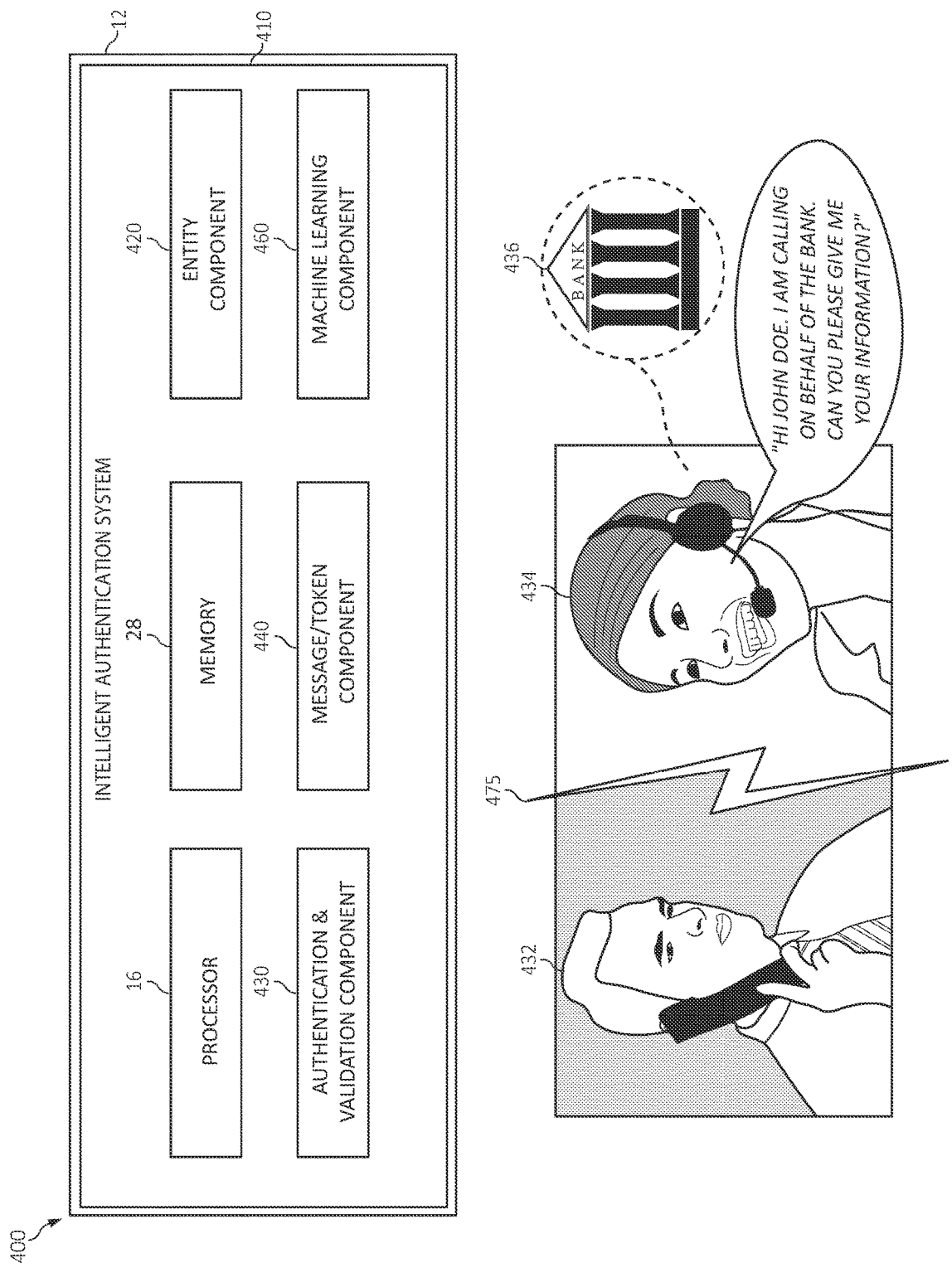
FIG. 4 is an additional block diagram depicting an exemplary functional relationship between various aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes (such as computer systems of vehicles) over a distributed computing network, where additional data collection, processing, analytics, and other functionality may be realized. The computer system/server 12 of FIG. 1, may include an intelligent authentication system 410. In one embodiment, the intelligent authentication system 410 may be in communication via network or communication link 475.

In one aspect, the intelligent authentication system 410 may be an independent computing service provided by one or more computing systems and servers (e.g., a "HUB") for illustrative convenience but may be included in one or more components, modules, services, applications, and/or functions of FIGS. 1-3). In an additional embodiment, the intelligent authentication system 410 may be located and installed within one or more user equipment ("UE" and not shown for illustrative convenience) that may be associated with the client/customer 432 and/or a server/computer associated with an entity 436 (e.g., a bank, business, government agency, educational institution, etc.).

Also, the intelligent authentication system 410 may incorporate processing unit 16 ("processor") and memory 28 of FIG. 1, for example, to perform various computational, data processing and other functionality in accordance with various aspects of the present invention. The intelligent authentication system 410 may also include an entity component 420, an authentication and validation component 430, a message/token component 440, and/or a machine learning component 460, each of which may be controlled and in communication with processing unit 16 and memory 28.

In one aspect, the authentication and validation component 430 may authenticate an operator such as, for example, caller 434 to have access to a secured location (e.g., a server/computer) associated with the entity 436 upon determining the operator (e.g., caller 434) retrieved and communicated back to a client/customer 432 a unique token, provided by the client/customer 432 (client/customer of the entity 436) and stored at the secured location (e.g., a computing server/website of the entity 436).

The message/token component 440 may generate the unique token for the client/customer 432 upon the client/customer 432 receiving a query for information over the one or more non-secure communication channels (e.g., communication link 475, such as a wireless communication channel, a website, etc.).

The authentication and validation component 430 may verify the operator (e.g., caller 434) has valid read access, write access, or a combination thereof for retrieving the unique token stored at the entity 436 (e.g., a secured location).

The authentication and validation component 430 may require the caller 434 to retrieve the unique token from the entity 436 (e.g., a secured location of the entity) and to communicate the unique token to the client/customer 432 over the one or more non-secure communication channels (e.g., communication link 475, such as a wireless communication channel, a website, etc.).

The entity component 420 may receive and store at the entity 436 (e.g., a secured location such as, for example, a secured server/computer) the unique token (generated by the message/token component 440) from the client/customer 432 each time the client/customer 432 receives a query for information over the one or more non-secure communication channels (e.g., communication link 475, such as a wireless communication channel, a website, etc.) from the caller 434. The entity component 420 may also maintain a list of predefined secured locations and corresponding operators to be verified.

The authentication and validation component 430 may also terminate communication between the client/customer 432 and the caller 434 upon determining the caller 434 failed to both retrieve the unique token from the entity 436 (e.g., a secured location) and communicate the unique token to the client/customer 432.

The entity component 420, associated with the entity 436, may display the unique token in an application of the entity 436 accessible by the client/customer 432 upon authenticating the caller 434 is associated with the entity.

The machine learning component 460 may learn the one or more contextual factors, the user profiles, reinforced feedback learning, the user experience satisfaction level, or a combination thereof.

The machine learning component 460, in association with the authentication and validation component 430, may learn details about each client/customer 432 and/or caller 434 to assist with learning previously authenticated/validated and/or non-authenticated/validated callers such as, for example, caller 434. In one aspect, the machine learning component 460, in association with the entity component 420, may collect explicit feedback from the client/customer 432, the caller 434, and/or entity 436 that may be processed, stored, and analyzed to proactively alert the user of previously approved callers (e.g., caller 434) and/or proactively alert that client/customer 434 the caller (e.g., caller 434) failed to previously be authenticated and/or verified.

In one aspect, the machine learning component 460 may include one or more machine learning operations, artificial intelligence ("AI"), and/or natural language processing ("NLP"). For example, the machine learning component 460 may use biometric/physiological data such as, for example, a voice recognition operation, to identify a voice of the caller 434, facial recognition to assist with identifying the caller 434 immediately at the time of the call. In one aspect, using the machine learning operation data, the intelligent authentication system 410 may proceed with other functionality as described herein. In short, the intelligent authentication system 410 may trigger and/or automatically activate the machine learning on an "as needed" basis to assist, if necessary, with the operations of the authentication and validation component 430.

In one aspect, the machine learning component 460, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

With the foregoing functional components 400 in view, consider the following examples such as, example 1 and example 2.

Assume in example 1, the client/customer 432 receives a call from caller 434, a person that claims to work for the entity 436 (e.g., "bank X"). Caller 434 asks Client/customer 432 to verify the identity and asks for personal information for client/customer 432 such as, for example, address and date of birth. Thus, the client/customer 432 needs to verify that caller 434 is a legitimate employee/associated and is working for entity 436 before providing to the caller 434 the personal information of the client/customer 432. The client/customer 432, in association with the message/token component 440, may generate (e.g., the message/token component 440 for the client/customer 432) a unique secret message and/or token such as, for example, message/token "!#Ad23!#" and asks the client/customer 432 to store this message/token "!#Ad23!#" to a profile space of the entity 436 (e.g., a user profile of the bank's website, for example) such as, for example, https://bankX.com/user=Client/customer 432/profile. Once the client/customer 432 (via the authentication and validation component 430) verifies that the message/token "!#Ad23!#" is stored, the client/customer 432 may visit the webpage of the entity 436 and determine/check if the client/customer's 432 message/token "!#Ad23!#" is stored and associated with the entity 436 (e.g., stored in the computing/server/webpage of the entity 536). If caller 434 is not associated with the entity 436 (e.g., the caller 434 is not a legitimate bank X employee), the caller 434 will not be able store the message/token "!#Ad23!#" and the authentication will fail. In an additional aspect, if caller 434 has inappropriately accessed the entity 436 (e.g., hacked the bank's website), the client/customer 432 may terminate the communication with the caller 434 to retrieve and provide personal information.

In example 2, the client/customer 432 receives a call from caller 434, a person that claims to work for the entity 436 (e.g., "bank X"). Caller 434 asks Client/customer 432 to verify the identity and asks for personal information for client/customer 432 such as, for example, address and date of birth. Thus, the client/customer 432 needs to verify that caller 434 is a legitimate employee/associated and is working for entity 436 before providing the personal information of the client/customer 432. The client/customer 432 may be an application (e.g., the intelligent authentication system 410) installed on a UE that generates a one-time token, which is transmitted to the entity 436 using a secure channel to a database secured by the bank. The caller 434 may have access to an internal database of the entity 436 and can determine/see the updated value and verbally relays the token to client/customer 432. The client/customer 432 now knows caller 434 has access to entity 436 (e.g., the internal database of the entity 436) and therefore does work for entity 436 (e.g., bank X). If caller 434 is not a legitimate employee/associate of the entity 436 (e.g., bank X employee), the caller 434 will not have access to the entity 436 (e.g., a secured database of the entity 436) and will not be able to check, see, observer, or learn the token of the client/customer 432 and the authentication and validation operation of user 434 will fail. It should be noted that if the caller 434 has hacked a website of the entity 436, the client/customer 432 would not need to communicate with caller 434 to retrieve any personal information.

Figure 5A:
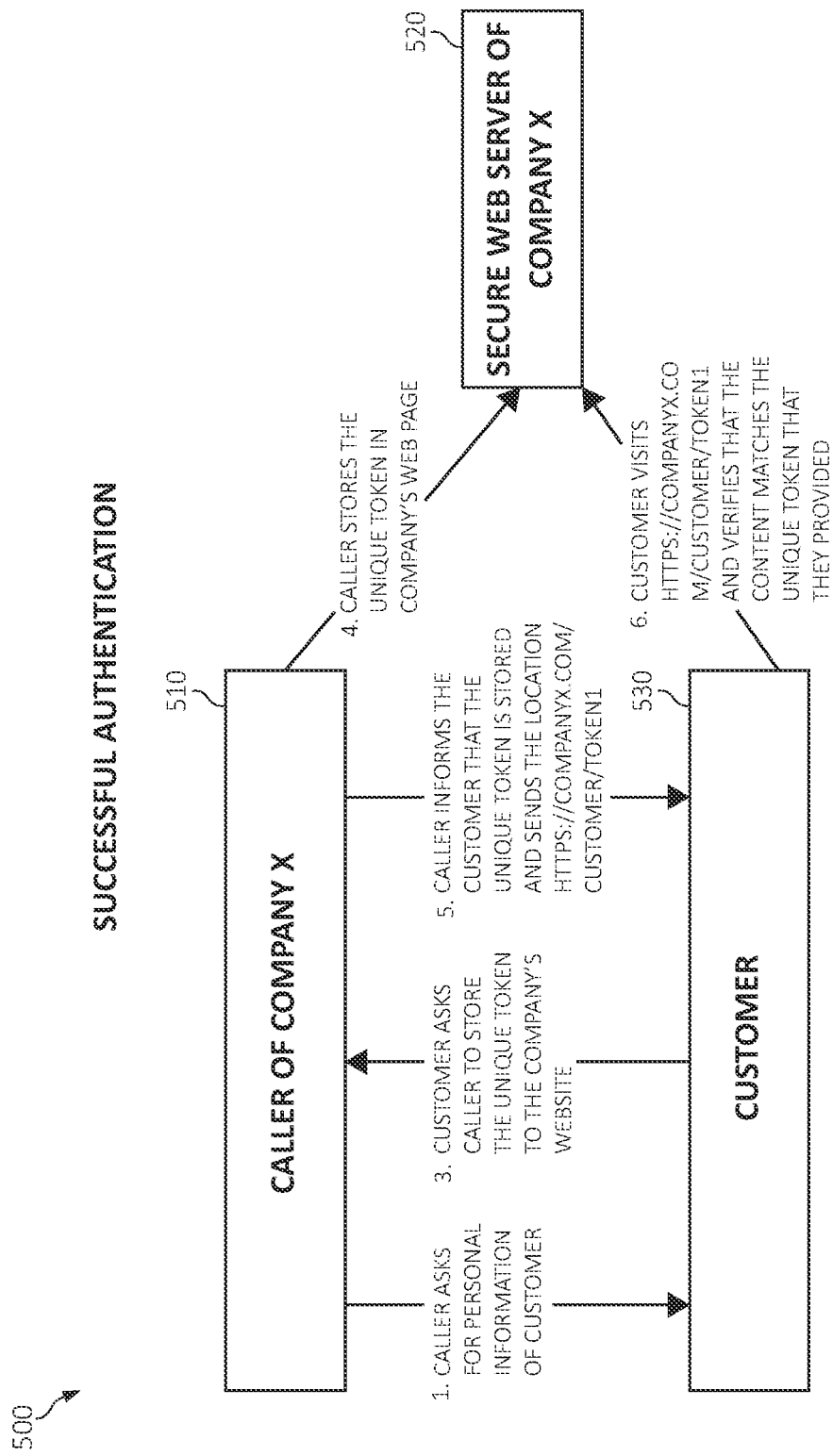
FIG. 5A is an additional block diagram depicting successful authentication of an operator claiming association with an entity in which various aspects of the present invention may be realized.
Figure 5B:
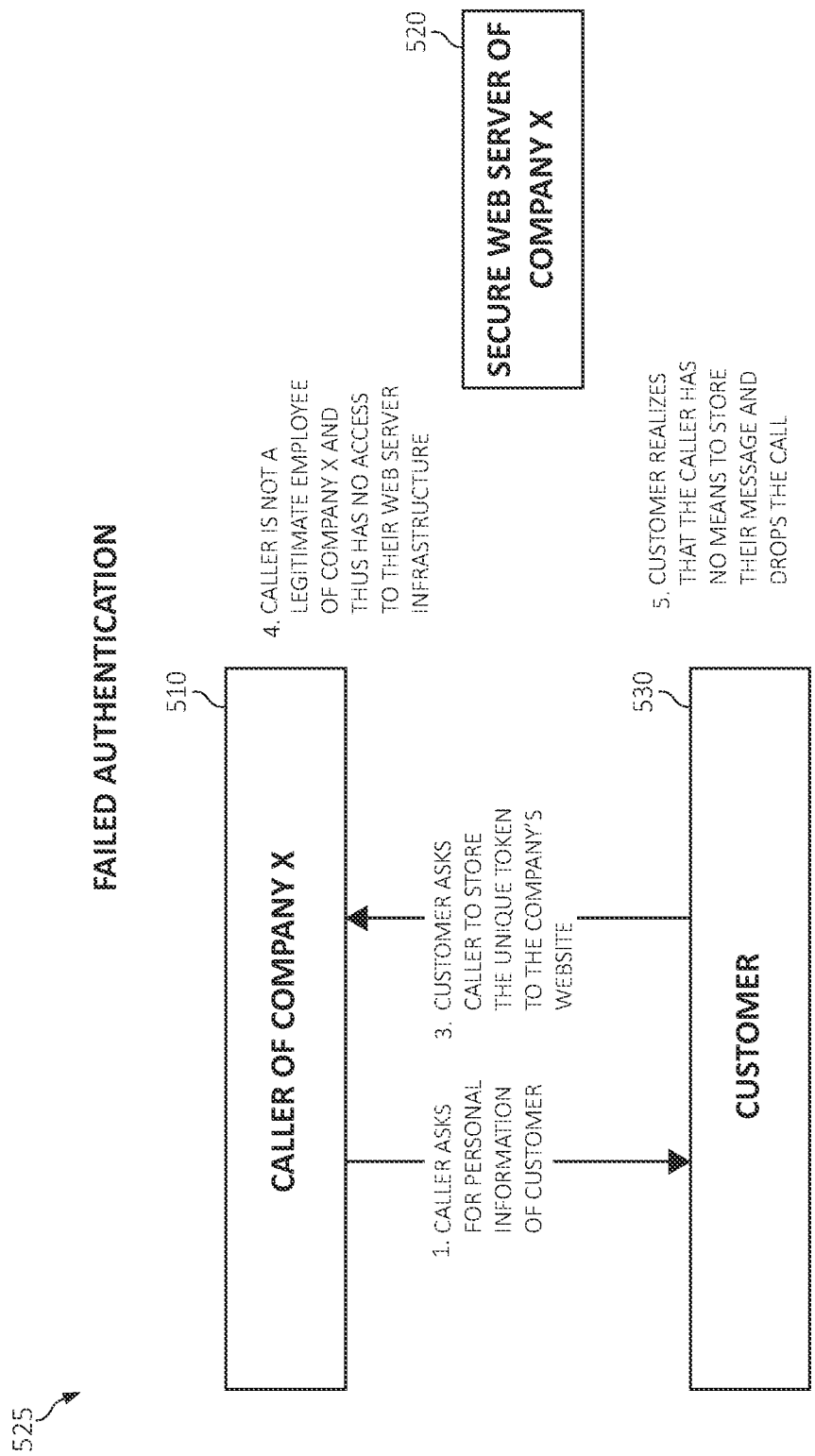
FIG. 5B is an additional block diagram depicting unsuccessful authentication of an operator claiming association with an entity in which various aspects of the present invention may be realized.

Turning now to FIGS. 5A and 5B, a block diagram of exemplary functionality 500 of FIG. 5A relating to successful authentication of an operator claiming association with an entity 520 is depicted. Alternatively, block diagram of exemplary functionality 525 of FIG. 5B relating to unsuccessful authentication (e.g., failed authentication) of an operator claiming association with an entity 520 is depicted.

As shown, the various blocks of functionality are depicted with arrows designating the blocks' 500 and 525 relationships with each other and to show process flow. Additionally, descriptive information is also seen relating each of the functional blocks 500 and 525. As will be seen, many of the functional blocks may also be considered "modules" of functionality, in the same descriptive sense as has been previously described in FIG. 4. With the foregoing in mind, the module blocks 500 and 525 may also be incorporated into various hardware and software components of a system for image enhancement in accordance with the present invention. Many of the functional blocks 500 and 525 may execute as background processes on various components, either in distributed computing components, or on the user device, or elsewhere.

By way of example only, FIG. 5A illustrates the successful authentication of an operator claiming association with an entity 520 a computing environment.

In step 1), a caller 510 (e.g., an operator/user of a company "X") may request/issue a query for personal/private information of a client/customer 530 associated with an entity 520 (e.g., company X).

In step 2), the client/customer 530 may generate a unique message/token (e.g., "SDA %%$$").

In step 3), the client/customer 530 may then request/query the caller 510 to store the unique token to a location (e.g., a website) associated with the entity 520 (e.g., company X). In step 4), the caller 510 may store the unique token to the location associated with the entity 520 (e.g., a secure web server of company X).

In step 5), the caller 510 may communicate/inform the client/customer 530 that the unique token is stored and sent the location (e.g., a website such as, for example, https://companyX.com/customer/token1) and verify the content matches the unique token that the client/customer 530 provided.

In step 6, the client/customer 530 may visit the website such as, for example, https://companyX.com/customer/token1) and verify that the matching content matches the unique token that the client/customer 530 provided.

More specifically, the operations of FIG. 5A may perform the following. 1. A client may generate a one-time code. 2. The user may verbally communicate the one-time code over the phone. 3. An organization representative may submit the one-time code to the system and verbally notify the caller they have completed the task. 4. The user may select/hit an option/button "verify code" and the application goes to a predefined uniform resource locator ("URL") to retrieve the one-time code and verify they match.

By way of example only, FIG. 5B illustrates the failed authentication (e.g., unsuccessful authentication of an operator claiming association with an entity 520 a computing environment.

In step 1), a caller 510 (e.g., an operator/user of a company "X") may request/issue a query for personal/private information of a client/customer 530 associated with an entity 520 (e.g., company X).

In step 2), the client/customer 530 may generate a unique message/token (e.g., "SDA %%$$").

In step 3), the client/customer 530 may then request/query the caller 510 to store the unique token to a location (e.g., a website) associated with the entity 520 (e.g., company X).

In step 4), the caller 510 is determined not to be associated with the entity 520 (e.g., a secure web server of company X) (e.g., the caller 510 is not a legitimate employ of secure web server of company X) and thus does not have access to the unique token in the location associated with the entity 520 (e.g., a secure web server of company X) such as, for example, the caller 510 does not have access to the unique token.

In step 5), the client/customer 530 determines/realizes (and/or may be informed via the entity 520) that the caller 510 has no access/means to store the message and drop the call. Said differently, the client/customer 530 may access an account/website account associated with the entity 520 and verifies that the caller 510 failed to communicate (e.g., over the phone and/or on the website) the unique token that the client/customer 530 provided.

More specifically, the operations of FIG. 5B may perform the following. 1. A client may generate a one-time code. 2. The client may transmit the one-time code to an organizational system. 3. The client may verbally notify the organizational representative the one-time code has been transmitted. 4. The organizational representative may log into the secured location/website of the organization and may verbally relays the one-time code back to the client.

Figure 6:
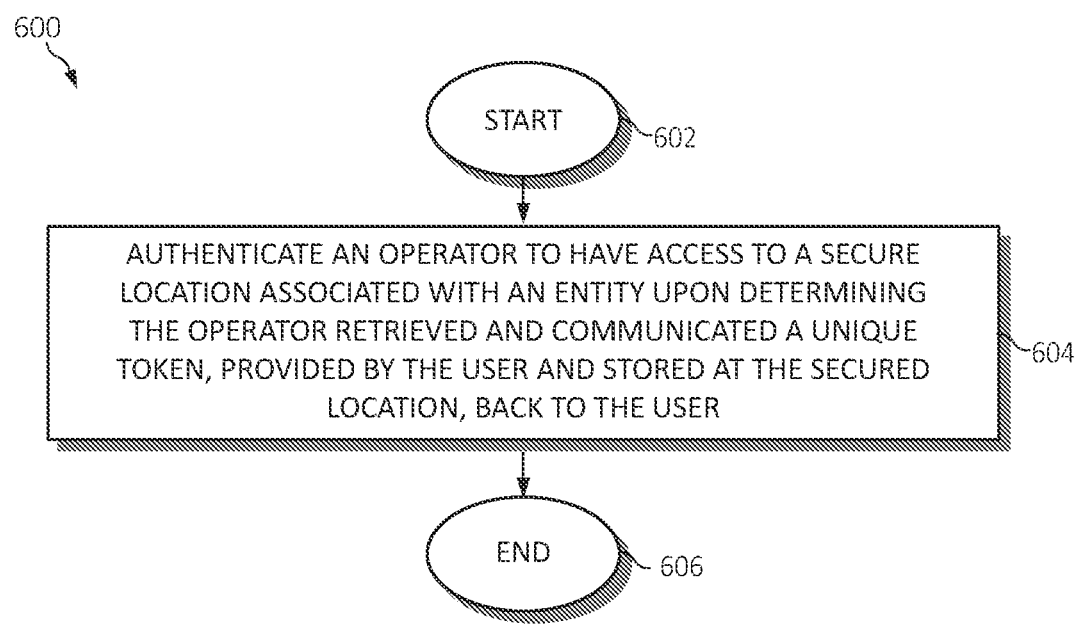
FIG. 6 is a flowchart diagram depicting an exemplary method for authenticating an entity in non-secure communication channels in a computing environment in which various aspects of the present invention may be realized.

Turning now to FIG. 6, a method 600 for authenticating an entity in non-secure communication channels by a processor is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

An operator may be authenticated to have access to a secured location associated with an entity upon determining the operator retrieved and communicated a unique token, provided by the user and stored at the secured location, back to the user, as in block 604. The functionality 600 may end, as in block 606.

Figure 7:
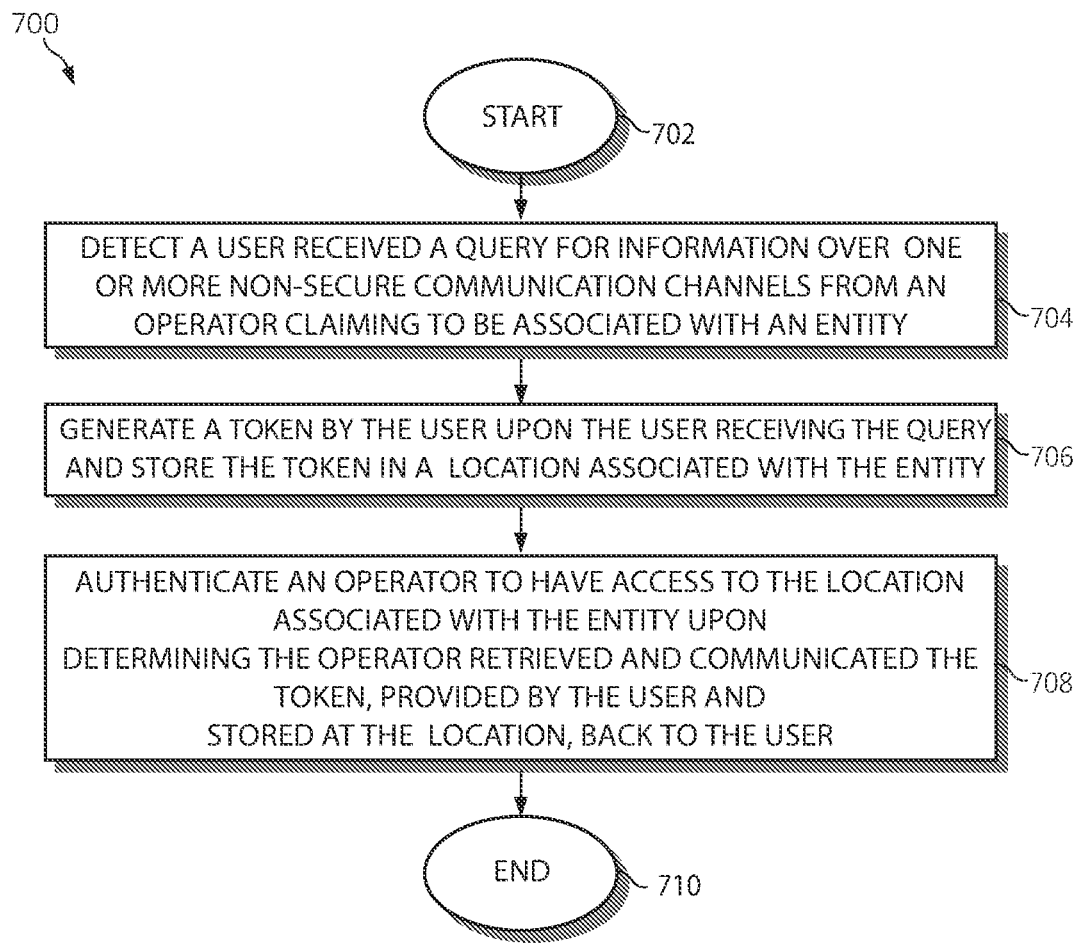
FIG. 7 is a flowchart diagram depicting an exemplary method for authenticating an entity in non-secure communication channels in a computing environment in which various aspects of the present invention may be realized.

Turning now to FIG. 7, a method 600 for authenticating an entity in non-secure communication channels by a processor is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

A query for information and received by a user over one or more non cure communication channels from an operator claiming to be associated with an entity may be detected, as in block 704. A token (e.g., a unique message or unique token) may be generated by the user upon the user receiving the query, and the token may be stored in a location (e.g., a secured location such as a computer server) associated with the entity, as in block 706. An operator may be authenticated to have access to the location associated with the entity upon determining the operator retrieved and communicated the token, provided by the user and stored at the location, back to the user, as in block 708. The functionality 700 may end, as in block 710.

As one of ordinary skill in the art will appreciate, the various steps depicted in methods 600 and 700 may be completed in an order or version differing from the depicted embodiment to suit a particular scenario. In one aspect, in conjunction with and/or as part of at least one block of FIGS. 6 and/or 7, the operations of functionality 600 and/or 700 may include each of the following. The operations of method 600 and/or 700 may further generate the unique token by the user upon the user receiving a query for information over the one or more non-secure communication channels. The operations of method 600 and/or 700 may verify the operator has valid read access, write access, or a combination thereof by the operator retrieving the unique token at the secured location.

The operations of method 600 and/or 700 may require the operator to retrieve the unique token from the secured location and to communicate the unique token to the user over the one or more non-secure communication channels. The operations of method 600 and/or 700 may receive and store at the secured location a unique token from the user each time the user receives a query for information over the one or more non-secure communication channels from the operator. The operations of method 600 and/or 700 may also terminate communication between the user and the operator upon determining the operator failed to both retrieve the unique token from the secured location and communicate the unique token to the user, and/or display the unique token in an application of the entity accessible with the user upon authenticating the operator is associated with the entity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for authenticating an entity using a processor, comprising:

initiating a communication session by an operator of the entity with a user, wherein the communication session is initiated using a non-secure communication channel;

generating, by the user, a unique token during the communication session and providing the unique token, by the user, to the operator during the communication session through the non-secure communication channel, wherein the unique token is generated for one-time use specific to the communication session;

authenticating the operator to have write access to a secured location associated with the entity upon determining the operator received the unique token provided by the user through the non-secure communication channel and input the unique token into an application requiring additional credentials to validate the user, wherein the application is provided by the entity and accessed by the user during the communication session through a secure communication channel; and displaying the unique token in the application provided by the entity and accessible by the user such that the user determines a veracity of the operator to be an agent of the entity upon identifying the unique token is correctly displayed in the application.

2. The method of claim 1, further including generating the unique token by the user upon the user receiving a query for information over the non-secure communication channel.

3. The method of claim 1, further including requiring the operator to retrieve the unique token from the secured location and to communicate the unique token to the user over the non-secure communication channel.

4. The method of claim 1, further including receiving and storing, at the secured location, the unique token from the user each time the user receives a query for information over the non-secure communication channel from the operator.

5. The method of claim 1, further including terminating the communication session between the user and the operator upon determining the operator failed to accurately input the unique token into the secured location as verified by the user according to the display of the unique token in the application.

6. A system for authenticating an entity, comprising:

one or more computers with executable instructions that when executed cause the system to:

initiate a communication session by an operator of the entity with a user, wherein the communication session is initiated using a non-secure communication channel;

receive a unique token generated by the user and provided to the operator during the communication session through the non-secure communication channel, wherein the unique token is generated for one-time use specific to the communication session;

authenticate the operator to have write access to a secured location associated with the entity upon determining the operator received the unique token provided by the user through the non-secure communication channel and input the unique token into an application requiring additional credentials to validate the user, wherein the application is provided by the entity and accessed by the user during the communication session through a secure communication channel; and display the unique token in the application provided by the entity and accessible by the user such that the user determines a veracity of the operator to be an agent of the entity upon identifying the unique token is correctly displayed in the application.

7. The system of claim 6, wherein the executable instructions further generate the unique token by the user upon the user receiving a query for information over the non-secure communication channel.

8. The system of claim 6, wherein the executable instructions further require the operator to retrieve the unique token from the secured location and to communicate the unique token to the user over the non-secure communication channel.

9. The system of claim 6, wherein the executable instructions further receive and store, at the secured location, the unique token from the user each time the user receives a query for information over the non-secure communication channel from the operator.

10. The system of claim 6, wherein the executable instructions further terminate the communication session between the user and the operator upon determining the operator failed to accurately input the unique token into the secured location as verified by the user according to the display of the unique token in the application.

11. A computer program product for authenticating an entity using a processor, the computer program product comprising a non-transitory computer-readable storage medium having computer-readable program code portions stored therein, the computer-readable program code portions comprising:

an executable portion that initiates a communication session by an operator of the entity with a user, wherein the communication session is initiated using a non-secure communication channel;

an executable portion that receives a unique token generated by the user and provided to the operator during the communication session through the non-secure communication channel, wherein the unique token is generated for one-time use specific to the communication session;

an executable portion that authenticates the operator to have write access to a secured location associated with the entity upon determining the operator received the unique token provided by the user through the non-secure communication channel and input the unique token into an application requiring additional credentials to validate the user, wherein the application is provided by the entity and accessed by the user during the communication session through a secure communication channel; and an executable portion that displays the unique token in the application provided by the entity and accessible by the user such that the user determines a veracity of the operator to be an agent of the entity upon identifying the unique token is correctly displayed in the application.

12. The computer program product of claim 11, further including an executable portion that generates the unique token by the user upon the user receiving a query for information over the non-secure communication channel.

13. The computer program product of claim 11, further including an executable portion that requires the operator to retrieve the unique token from the secured location and to communicate the unique token to the user over the non-secure communication channel.

14. The computer program product of claim 11, further including an executable portion that receives and stores, at the secured location, the unique token from the user each time the user receives a query for information over the non-secure communication channel from the operator.

15. The computer program product of claim 11, further including an executable portion that terminates the communication session between the user and the operator upon determining the operator failed to accurately input the unique token into the secured location as verified by the user according to the display of the unique token in the application.

* * * * *